(12) United States Patent
Knight et al.

(10) Patent No.: US 10,150,241 B2
(45) Date of Patent: *Dec. 11, 2018

(54) HIGH STRETCH RATIO PREFORMS AND RELATED CONTAINERS AND METHODS

(71) Applicant: DR PEPPER/SEVEN UP, INC., Plano, TX (US)

(72) Inventors: Brandon W. Knight, Allen, TX (US); Patrick T. George, Plano, TX (US); David A. Brunson, Raymore, MO (US)

(73) Assignee: DR PEPPER/SEVEN UP, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,515

(22) Filed: Nov. 20, 2017

(65) Prior Publication Data

US 2018/0071968 A1  Mar. 15, 2018

Related U.S. Application Data

(63) Continuation of application No. 14/634,468, filed on Feb. 27, 2015, now Pat. No. 9,821,505.

(51) Int. Cl.
*B29B 11/14* (2006.01)
*B29C 49/00* (2006.01)
(Continued)

(52) U.S. Cl.
CPC .......... *B29C 49/0073* (2013.01); *B29B 11/14* (2013.01); *B29C 49/10* (2013.01);
(Continued)

(58) Field of Classification Search
CPC ........ B29K 2105/258; B29K 2067/003; B29B 11/14; B29B 2911/1402;
(Continued)

(56) References Cited

U.S. PATENT DOCUMENTS 5,011,648 A  4/1991  Garver et al.
5,281,387 A  1/1994  Collette et al.
(Continued)

FOREIGN PATENT DOCUMENTS

JP  2009045877  3/2009
WO  WO2014/101957  7/2014

OTHER PUBLICATIONS

PCT International Search Report, PCT/US16/16406, dated Apr. 14, 2016 (2 pages).
(Continued)

*Primary Examiner* — Michael Safavi
(74) *Attorney, Agent, or Firm* — Pizarro Allen PC

(57) ABSTRACT

A generally hollow preform for making a stretch blow-molded container may include a threaded finish portion; a neck portion depending from the finish portion; a transition portion depending from the neck portion; a main portion depending from the transition portion; and a closed, generally rounded tip portion depending from the main portion. The preform may include stretch ratios with respect to the container including an axial stretch ratio of about 3.0 to 3.5, a hoop stretch ratio of about 5.0 to 5.5, and a total stretch ratio of about 15 to 19.25. In some embodiments, high stretch ratios may be achieved with less material, yielding substantial cost savings.

20 Claims, 6 Drawing Sheets

(51) Int. Cl.
*B65D 1/02* (2006.01)
*B29C 49/10* (2006.01)
*B29K 67/00* (2006.01)
*B29K 105/00* (2006.01)
*B29L 31/00* (2006.01)

(52) U.S. Cl.
CPC .... *B65D 1/0246* (2013.01); *B29B 2911/1402* (2013.01); *B29B 2911/1404* (2013.01); *B29B 2911/14026* (2013.01); *B29B 2911/14033* (2013.01); *B29B 2911/1498* (2013.01); *B29B 2911/14606* (2013.01); *B29B 2911/14633* (2013.01); *B29C 2049/0089* (2013.01); *B29K 2067/003* (2013.01); *B29K 2105/258* (2013.01); *B29L 2031/712* (2013.01)

(58) Field of Classification Search
CPC . B29B 2911/14033; B29B 2911/14026; B29B 2911/1404; B29B 2911/1498; B29B 2911/14606; B29B 2911/14633; B29C 2049/0089; B29C 49/0073; B65D 1/0246
USPC .......................................... 428/542.8, 36.92
See application file for complete search history.

(56) References Cited

U.S. PATENT DOCUMENTS

| | | |
|---|---|---|
| 5,520,877 A | 5/1996 | Collette et al. |
| 5,628,957 A | 5/1997 | Collette et al. |
| 5,637,167 A | 6/1997 | Krishnakumar et al. |
| 5,728,347 A | 3/1998 | Collette et al. |
| 5,884,792 A | 3/1999 | Krishnakumar et al. |
| 5,888,598 A | 3/1999 | Brewster et al. |
| 6,090,460 A | 7/2000 | Collette et al. |
| 6,230,547 B1 | 5/2001 | Carroll, Jr. |
| 6,391,408 B1* | 5/2002 | Hutchinson ......... B29C 45/1625 215/12.1 |
| 6,548,133 B2 | 4/2003 | Schmidt et al. |
| 6,841,262 B1 | 1/2005 | Beck et al. |
| 7,572,493 B2 | 8/2009 | Shi |
| 7,820,257 B2 | 10/2010 | Kjorlaug et al. |
| 8,247,049 B2 | 8/2012 | Shi et al. |
| 8,865,278 B2 | 10/2014 | Krikor et al. |
| 2002/0022099 A1* | 2/2002 | Schmidt ................ B32B 27/18 428/35.7 |
| 2008/0044604 A1* | 2/2008 | Hutchinson .............. B05D 1/18 428/35.7 |
| 2009/0301991 A1 | 12/2009 | Yarro et al. |
| 2012/0107541 A1 | 5/2012 | Nahill et al. |
| 2012/0263902 A1 | 10/2012 | Hanan |
| 2015/0110983 A1* | 4/2015 | Kriegel ............... B29C 49/0005 428/36.6 |
| 2016/0167279 A1* | 6/2016 | Besson ............... B29C 49/0005 426/590 |
| 2016/0236820 A1* | 8/2016 | Paauwe ................. B65D 25/16 |

OTHER PUBLICATIONS

Written Opinion of the International Searching Authority, PCT/US16/16406, dated Apr. 14, 2016 (6 pages).

* cited by examiner

A - A

B - B

HIGH STRETCH RATIO PREFORMS AND RELATED CONTAINERS AND METHODS

CROSS REFERENCE TO RELATED APPLICATIONS

This application is a continuation of U.S. patent application Ser. No. 14/634,468 filed Feb. 27, 2015, the disclosure of which is incorporated herein by reference.

FIELD

The present application relates to preforms as well as molded containers and methods of using preforms to manufacture molded containers.

BACKGROUND

Containers produced using blow-mold processes generally need to conform to various specifications. Particularly, the walls of blow-mold containers generally must maintain a suitable level of stiffness and strength to withstand shipping and handling operations throughout a product lifecycle. Moreover, walls of a container may not be too weak to be deemed of poor quality by consumers. In addition, containers must maintain suitable gas barrier properties to prevent spoilage of beverages contained therein and to prevent carbonated or other gas containing beverages from becoming flat.

Generally, to meet the demands of blow-mold containers, a minimum level of material must be included in preforms used in the blow-mold process. On the other hand, minimizing the amount of material in preforms used to make blow-mold containers would be beneficial because it would provide an economic advantage. There is a need for preforms and methods of making blow-mold containers that minimize amounts of material used in preforms yet maintain acceptable performance of the resulting containers.

SUMMARY

In some embodiments, a generally hollow preform for making a stretch blow-molded container may include a threaded finish portion; a neck portion depending from the finish portion including substantially cylindrical walls; a transition portion depending from the neck portion and including a first substantially conical wall section having a first taper of wall thickness; a main portion depending from the transition portion including a second substantially conical wall section having a second taper of wall thickness, the second taper of wall thickness being lesser than said first taper of wall thickness; and a closed, generally rounded tip portion depending from the main portion, the tip portion having a third taper of wall thickness; wherein the preform includes stretch ratios with respect to the container including an axial stretch ratio of about 3.0 to 3.5, a hoop stretch ratio of about 5.0 to 5.5, and a total stretch ratio of about 16 to 18.

In some embodiments, a generally hollow PET preform for making a stretch blow-molded container may include a threaded finish portion; a neck portion depending from the finish portion, the neck portion including substantially cylindrical walls; a transition portion depending from the neck portion, the transition portion including a first substantially conical wall section and having a percentage taper of about 54% to about 58%; a main portion depending from the transition portion, the main portion including a second substantially conical wall section and having a percentage taper of about 2% to about 5%; and a closed, generally rounded tip portion depending from the main portion, the tip portion having a percentage taper of about 38% to about 45%; wherein the preform comprises stretch ratios with respect to the container including an axial stretch ratio of about 3 to 3.5, a hoop stretch ratio of about 5 to 5.5, and a total stretch ratio of about 16 to 18.

DETAILED DESCRIPTION

The following terms as used herein should be understood to have the indicated meanings.

When an item is introduced by "a" or "an," it should be understood to mean one or more of that item.

The term "comprises" means includes but is not limited to.

The term "comprising" means including but not limited to.

The term "having" means including but not limited to.

This disclosure is directed to preforms suitable for use in making blow-mold containers, particularly including bottles suitable for use with beverages. This disclosure is also directed to methods of making blow-mold containers that include use of preforms as described herein. In some embodiments, preforms may include reduced amounts of material as compared to those typically used in the industry. For example, in some embodiments, an amount of a poly (ethylene terephthalate) resin, commonly referred to as "PET," included in a preform and in resulting containers produced therefrom may be reduced as compared to amounts commonly found in the industry. Surprisingly, such reduction in material may be achieved without sacrificing quality of the finished containers. For example, using some embodiments of preforms described herein, it has surprisingly been found that the strength of container walls as well as gas barrier properties may not be significantly compromised.

For example, in some embodiments, a preform made of about 18.75 grams of PET material may be used to manufacture a 20 oz. bottle suitable for various beverages, including carbonated beverages, and having strength, stiffness, and gas barrier properties comparable to those of a 20 oz. bottle made from a 22.2 gram PET preform. Thus, as described further below, a 15.5% reduction of material may be achieved, yielding substantial cost savings over large manufacturing quantities, while maintaining substantially the same product quality, which persons of skill in the art did not believe possible. In some embodiments, a preform having between about 18.6 grams and about 19.5 grams of PET material may be used to manufacture an about 20 oz. bottle, including bottles that may differ in volume from a 20 oz. bottle by up to about 5%. More generally, the weight of a preform may be adjusted for making containers of different sizes, and containers over a range of suitable sizes, including, for example, from about 68 oz. to about 12 oz., may be manufactured using preforms as described herein.

Figure 1:
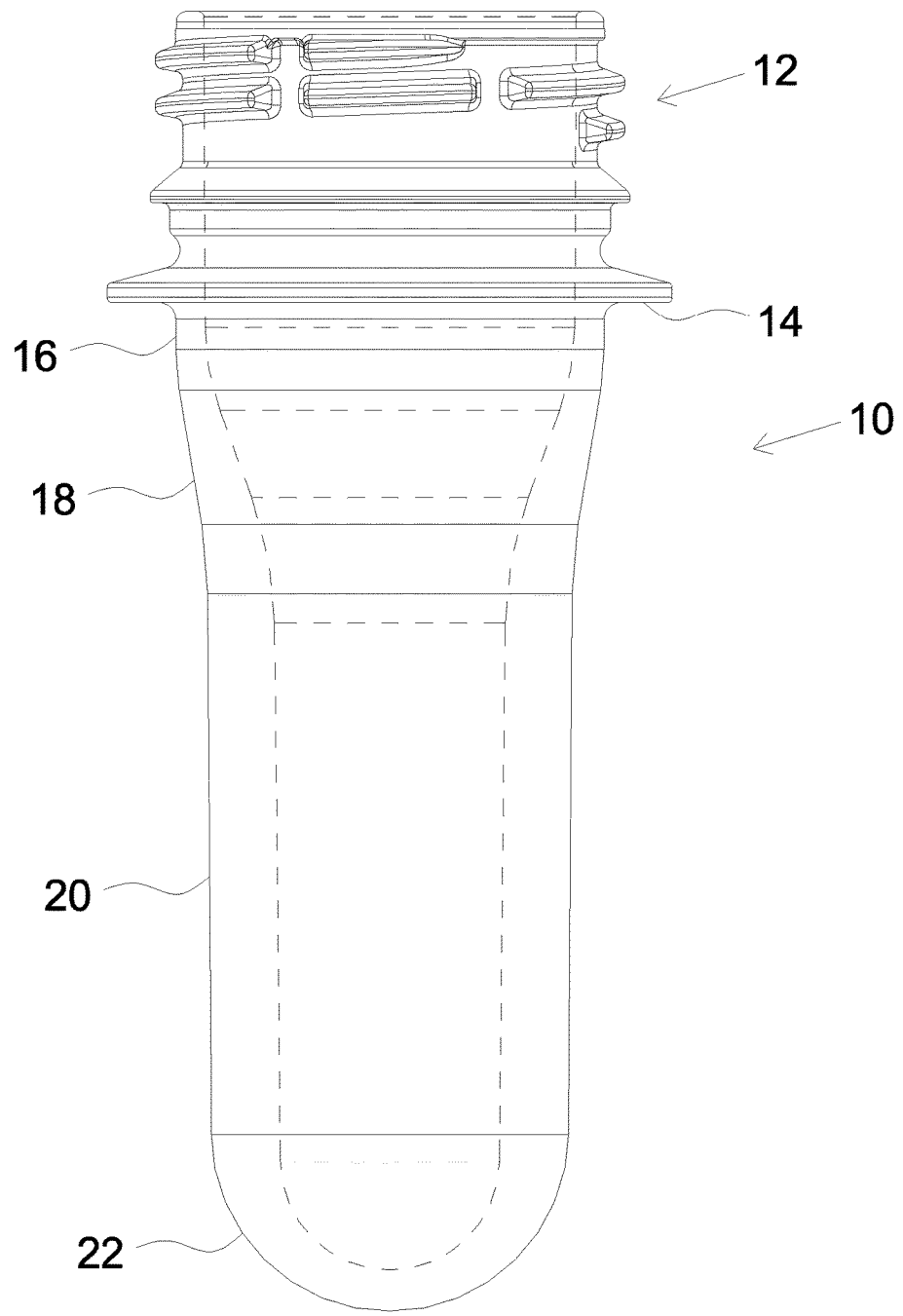
FIG. 1 is a front elevational view of a preform.

As shown in FIG. 1, a preform 10 made of PET or other suitable material may have a threaded finish portion 12, a support flange 14, a neck portion 16, a transition portion 18, a main portion 20, and a tip portion 22. Preform 10, which may be generally hollow and cylindrical, may be used to make various blow-mold containers, particularly including beverage bottles, and may be fully compatible with standard blow-molding machinery. Support flange 14 may help to mount preform 10 to blow-molding machinery. Neck portion 16 may be adjacent support flange 14, and transition portion 18 may provide a gradual transition from neck portion 16 to main portion 20. Transition portion 18 may include tapered walls with a thickness that increases in a direction moving away from the top of the preform 10. Similarly, the main portion 20 may include tapered walls that increase in thickness along a direction moving away from the top of the preform 10. The main portion 20 may extend between the transition portion 18 and a tip portion 22 located at a bottom end of the preform 10. In some embodiments, the tip portion 22 may include a generally hemispherical rounded bottom with walls that taper from one thickness at the transition from the main portion 20 to a smaller thickness at the very bottom.

Figure 2:
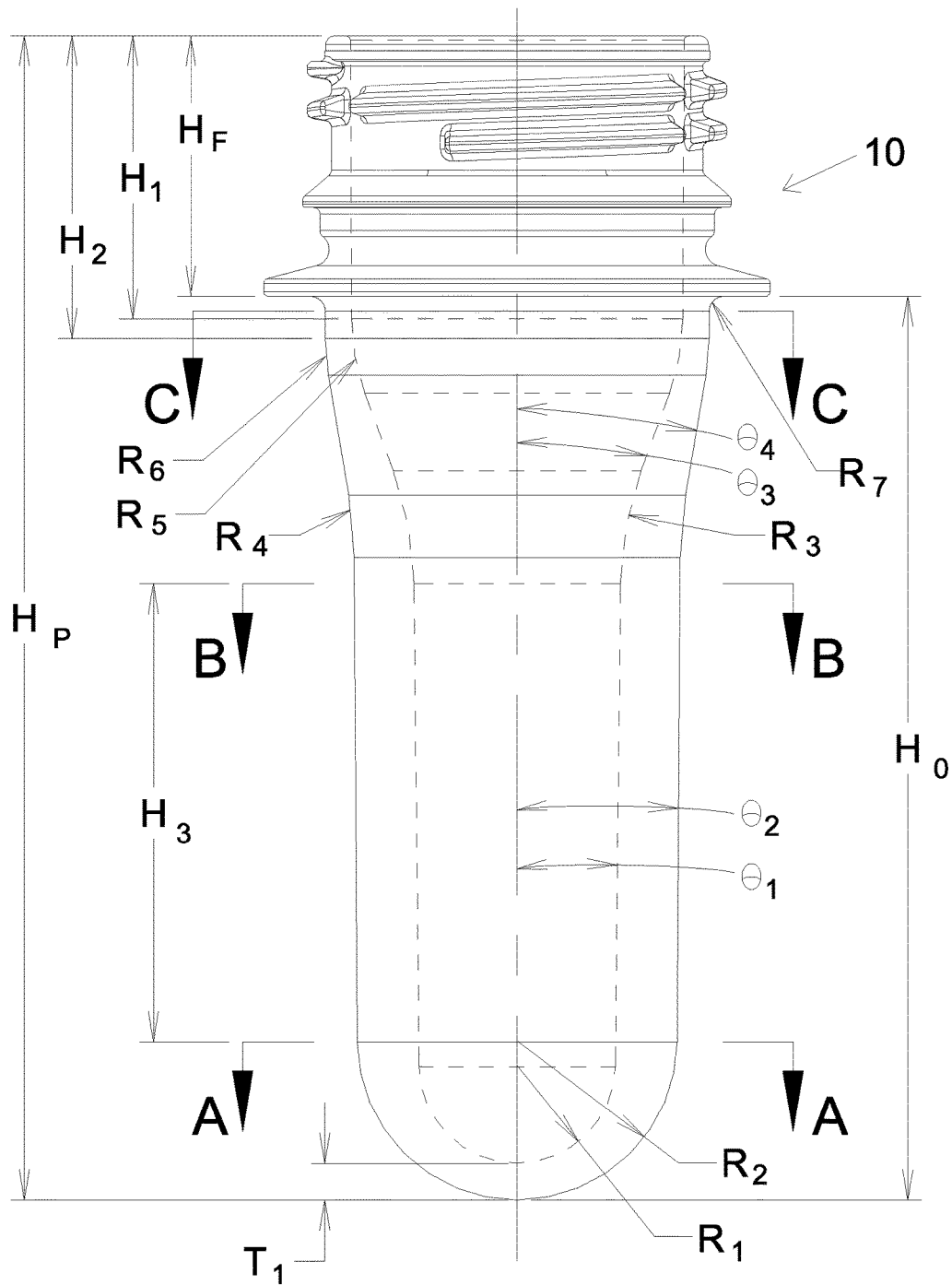
FIG. 2 is a side elevational view of the preform of FIG. 1.

Preform 10 is also shown in further detail in FIG. 2. As shown therein, threaded finish 12 may have a height $H_F$ which is the vertical distance between the top of preform 10 and the bottom edge of support flange 14. Preform 10 may also have an overall height $H_P$. The portion of preform 10 below support flange 14 (i.e., portions 16, 18, 20, and 22) may have a height $H_O = H_P - H_F$, which is the portion that is stretched in the process of blow-molding a container from preform 10. The height of neck portion 16 may be defined by the difference $H_2 - H_F$.

The bottom edge of the support flange 14 also identifies the top boundary of the neck portion 16. In some embodiments, where the support flange 14 and neck portion 16 meet, the outer surface of the preform 10 may be rounded as may be characterized by a radius of curvature $R_7$. For example, in some embodiments, the radius $R_7$ may be a suitable dimension such as to accommodate available blow-mold machinery and/or to relieve material stress in preform 10.

In some embodiments, neck portion 16 may have a wall thickness that is significantly thinner than other neck walls commonly used in the industry. The wall thickness of neck portion 16 may be thinner than typically found in the industry because of a decreased outer diameter of the neck portion 16. The inner diameter of the neck portion 16 may, in some embodiments, be maintained within ranges typical of the industry to facilitate compatibility of the preform 10 to standard blow-molding machinery. With this design, heat may be transferred more effectively through neck portion 16, thereby enhancing the stretchability of preform 10. Therefore, some embodiments herein may maintain compatibility with standard blow-molding machinery, but encourage increased heat flow through the neck portion 16, leading to better material flow downward into the lower region that ultimately forms the feet of the resulting container (e.g., portion 110 of bottle 100 shown in FIG. 6). The neck portion 16 is also described with regard to FIG. 5, which incldues a cross section of preform 10 taken along the line C-C of neck portion 16.

In FIGS. 1 and 2, inner surfaces of preform 10 are shown with dashed lines. Horizontal dashed lines extending between the left and right sides of preform 10 indicate the tangent positions where the inner surface of preform 10 transitions between flat (e.g., cylindrical or conical) regions and curved regions. Similarly, horizontal solid lines extending between the left and right sides of preform 10 indicate the tangent positions where the outer surface of preform 10 transitions between flat (e.g., cylindrical or conical) regions and curved regions. The curved regions (defined by radii $R_1$-$R_7$) serve as smooth transitions between the hemispherical, cylindrical, or conical regions.

Referring to FIG. 2, preform 10 may also be characterized by the heights $H_1$ and $H_2$. The height $H_1$ is the vertical distance between the top of the preform 10 and a horizontal plane where an inner surface of the preform 10 transitions from a vertical (cylindrical) portion to a curved portion (defined by radius $R_5$) when moving downward along the inner surface of the preform 10. The height $H_2$ is the vertical distance between the top of the preform 10 and a horizontal plane where the outer surface of preform 10 transitions from a vertical (cylindrical) portion to a curved portion (defined by radius $R_6$) when moving downward along the outer surface of the preform 10. The dimensions $H_1$ and $H_2$ may thus determine a distance from the top of the preform 10 to where inner and outer surfaces of the preform 10 begin to curve inward, which may, in some embodiments, be used to create a taper in the transition portion 18. Radii $R_5$ and $R_6$ may define smooth transitions from the neck portion 16 to the transition portion 18.

As further shown in FIG. 2, the transition portion 18 may include regions where the inner surface and outer surface of the preform 10 are flat along vertical line segments (e.g., conical surfaces), and the wall thickness may be tapered. The transition portion 18 may include an inner conical surface characterized by an inner angle $\theta_3$ and an outer conical surface characterized by an outer angle $\theta_4$. The walls of transition portion 18 may generally taper such that the wall thickness increases moving downward toward main portion 20.

As further shown in FIG. 2, transition portion 18 is adjacent the main portion 20 of the preform 10. The main portion 20 may generally be longer than other portions of the preform 10. For example, in some embodiments, the length (or height) of the main portion 20 may be about 3 times longer than that of the transition portion 18. In some embodiments, the length (or height) of the main portion 20 may be between about 2 times and about 3 times longer than that of the tip portion 22. Like the transition portion 18, the main portion 20 may include regions where the inner surface and outer surface of the preform 10 are flat along vertical line segments (e.g., conical surfaces defined by angles $\theta_1$ and $\theta_2$, respectively), and the wall thickness may be tapered. Radii $R_3$ and $R_4$ may define smooth transitions from the transition portion 18 to the main portion 20. In some embodiments, the taper in the main portion 20 may be significantly less than the taper in the transition portion 18. For example, in some embodiments, transition portion 18 may taper from a wall thickness of about 1.7 mm to a wall thickness of about 3.9 mm, and main portion 20 may taper from a wall thickness of about 3.9 mm to a wall thickness of about 4.0 mm.

In some embodiments, a taper of wall thickness of a preform 10 may be characterized in terms of a lesser wall thickness and a greater wall thickness and may be expressed as a percentage or ratio. For example, a percentage taper may characterize a part of a preform and may be defined according to the following formulas:

Percentage taper=[(maximum wall thickness−minimum wall thickness)/(maximum wall thickness)]×100%

For example, the taper in a transition portion 18 may vary from about 1.7 mm to about 3.9 mm, yielding a percentage taper of about 56%. In some embodiments, transition portion 18 may be characterized by a percentage taper of about 54% to about 58%. In some embodiments, main portion 20 may be characterized by a percentage taper of about 3.2%, or about 2% to about 5%.

In some embodiments, tip portion 22 may include an inner surface characterized by a radius of curvature $R_1$ and an outer surface characterized by a radius of curvature $R_2$. The wall thickness at the very bottom of tip portion 22 is indicated as $T_1$ in FIG. 2. In some embodiments, tip portion 22 may have a taper in wall thickness from a thickness $T_2$ (shown in FIG. 3) to a smaller thickness $T_1$ as shown in FIG. 2. For example, in some embodiments, tip portion 22 may taper from a wall thickness $T_2$ of about 4.0 mm to a wall thickness $T_1$ of about 2.4 mm. In some embodiments, a tip portion 22 may be characterized by a percentage taper of about 40%, or about 38% to about 45%.

Figure 3:
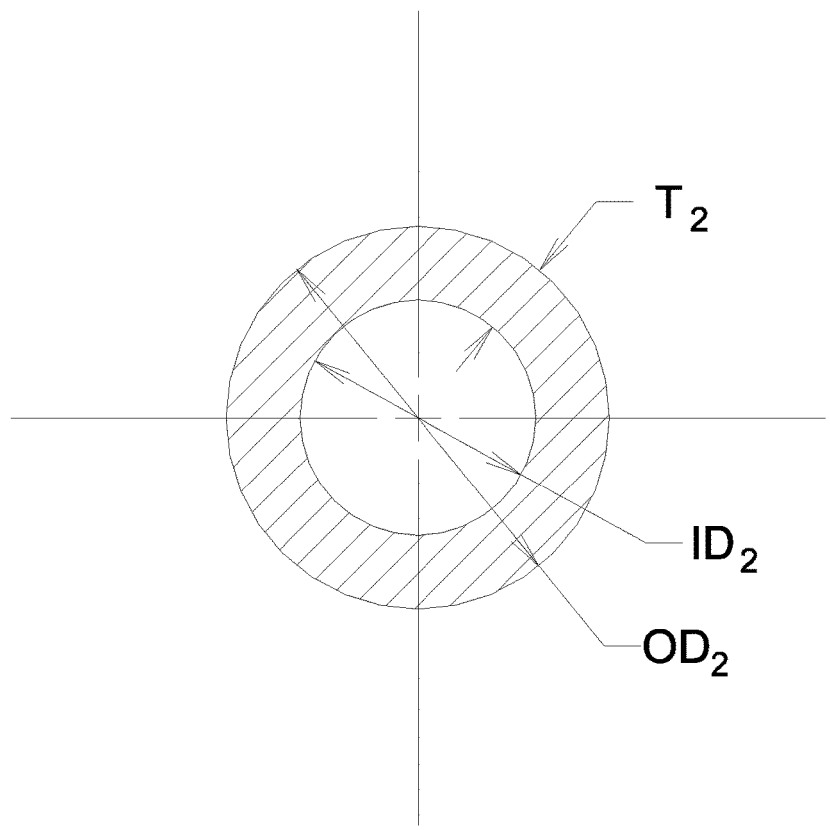
FIG. 3 is a cross sectional view of the preform of FIG. 1 taken along section line A-A as shown in FIG. 2.
Figure 4:
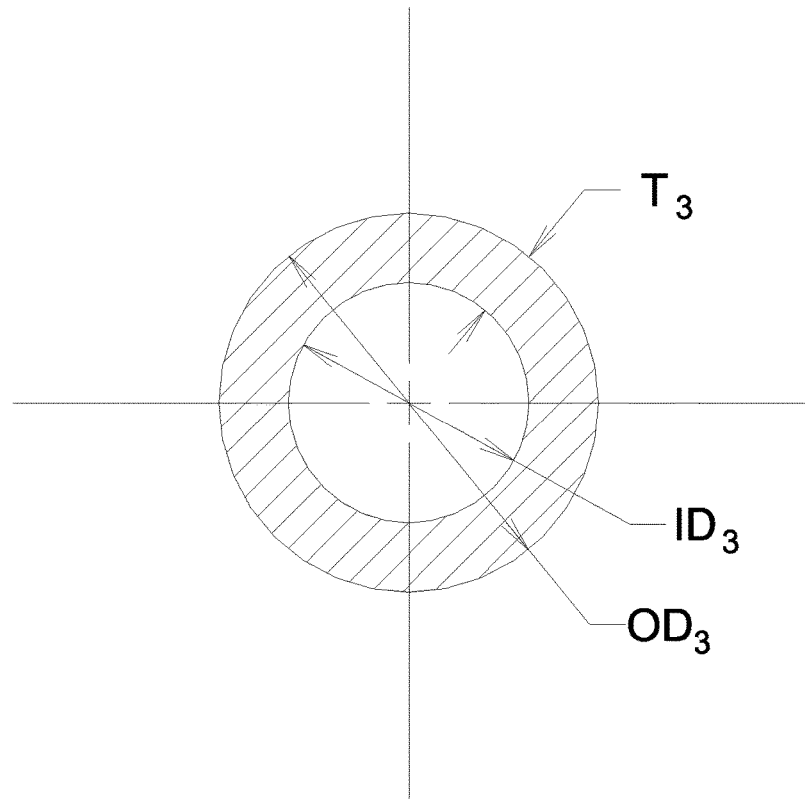
FIG. 4 is a cross sectional view of the preform of FIG. 1 taken along section line B-B as shown in FIG. 2.
Figure 5:
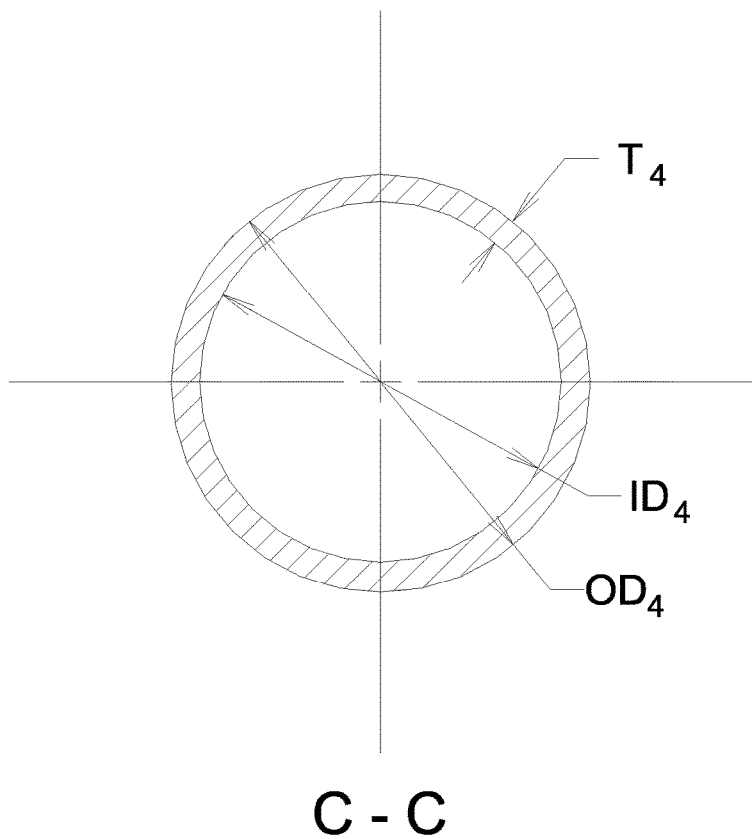
FIG. 5 is a cross sectional view of the preform of FIG. 1 taken along section line C-C as shown in FIG. 2.

Section lines A-A, B-B, and C-C are shown in FIG. 2, and corresponding cross sectional views are shown in FIGS. 3, 4, and 5, respectively, each of which depicts the inner diameter (ID), outer diameter (OD), and wall thickness (T) of preform 10 at the respective cross section.

Figure 6:
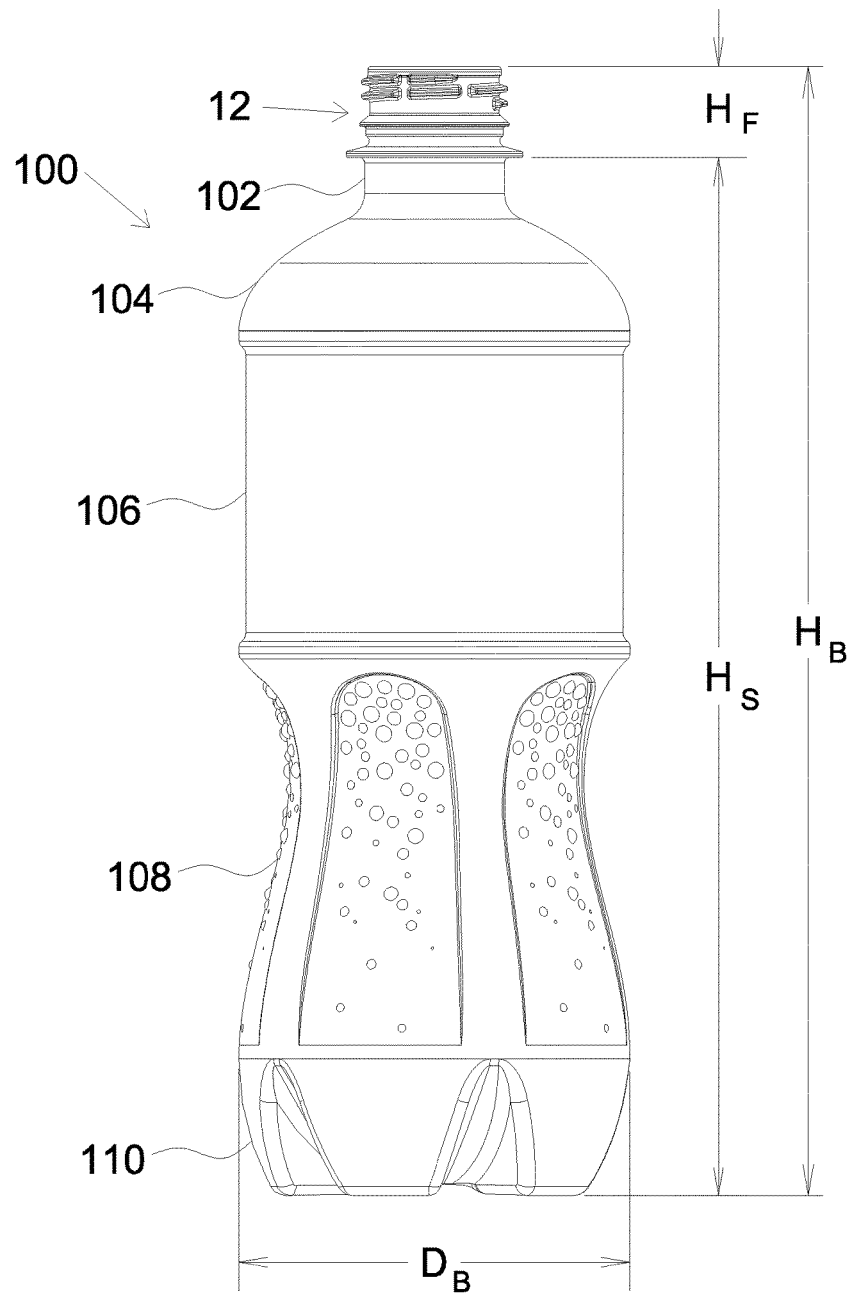
FIG. 6 is a side elevational view of a container made from the preform of FIG. 1.

In FIG. 6, a sample container 100 is shown. Container 100 may be made from a preform 10 as described herein using a mold and blow-molding machine. Container 100 may include threaded finish 12 having a height $H_F$ which may be substantially unchanged from that of preform 10. Container 100 may also include a bottle neck 102 and various other shaped portions generally defined by the mold used in the blow-mold process. For example, the representative bottle in FIG. 6 includes a shoulder section 104, a label section 106, a textured grip section 108, and a base section 110. Container 100 may be further characterized by various dimensions including a height $H_B$, a height $H_S$, and a maximum diameter $D_B$. The height $H_B$ of container 100 is the overall vertical distance from the top to the bottom of the container 100 including the finish 12. The height of the container 100 below the finish 12 is height $H_S=H_B-H_F$. The diameter $D_B$ is the maximum external diameter of the container 100, which in this example may be located at the base section 110. Other containers may be shaped differently using other molds, so the maximum diameter may be at another location.

In some embodiments, the dimensions referenced herein may be used to design an about 20 oz. container and may be as follows:

TABLE 1

| Dimension | Sample Value | Range |
|---|---|---|
| $R_1$ | 6.4 mm | (Controlled by other dimensions including heights and diameters) |
| $R_2$ | 10.42 mm | (Controlled by other dimensions including heights and diameters) |
| $R_3$ | 22.23 mm | (Controlled by other dimensions including heights and diameters) |
| $R_4$ | 25.4 mm | (Controlled by other dimensions including heights and diameters) |
| $R_5$ | 14.27 mm | (Controlled by other dimensions including heights and diameters) |
| $R_6$ | 14.27 mm | (Controlled by other dimensions including heights and diameters) |
| $R_7$ | .99 mm | (Controlled by other dimensions including heights and diameters) |
| $H_1$ | 18.724 mm | +/−1.5% |
| $H_2$ | 19.785 mm | +/−1.5% |
| $H_3$ | 31.49 mm | +/−1% |
| $H_F$ | 17 mm | +/−1.5% |
| $H_P$ | 76 mm | +/−1% |
| $H_O$ | 59 mm | +/−1% |
| $H_S$ | 194.12 mm | +/−1.52 mm |
| $H_B$ | 211.12 mm | +/−1.52 mm |
| $ID_2$ | 12.8 mm | +/−2% (maintain range specified for $OD_2$, $T_1$, and $T_2$) |
| $ID_3$ | 13.475 mm | +/−2% (maintain range specified for $OD_3$ and $T_3$) |
| $ID_4$ | 21.58 mm | +/−2% (maintain range specified for $OD_4$ and $T_4$) |
| $OD_2$ | 20.84 mm | +/−2% (maintain range specified for $ID_2$, $T_1$, and $T_2$) |
| $OD_3$ | 21.235 mm | +/−2% (maintain range specified for $ID_3$ and $T_3$) |
| $OD_4$ | 24.995 mm | +/−2% (maintain range specified for $ID_4$ and $T_4$) |
| $T_1$ | 2.4 mm | +/−2% |
| $T_2$ | 4.01 mm | +/−2% (maintain range specified for percentage taper of main portion) |
| $T_3$ | 3.88 mm | +/−2% (maintain range specified for percentage taper of transition portion) |
| $T_4$ | 1.707 mm | +/−2% |
| $\theta_1$ | .615 degrees | (Controlled by other dimensions including heights and diameters) |
| $\theta_2$ | .375 degrees | (Controlled by other dimensions including heights and diameters) |
| $\theta_3$ | 19.998 degrees | (Controlled by other dimensions including heights and diameters) |
| $\theta_4$ | 9.567 degrees | (Controlled by other dimensions including heights and diameters) |
| Percentage Taper | | |
| Transition 18 | 56% | 54% to 58% |
| Main 20 | 3% | 2% to 5% |
| Tip 22 | 40% | 38% to 45% |

Preforms configured for use in blow-mold processing may be characterized by stretch ratios. Preform stretch ratios are commonly used to describe preforms and blow-mold processes and include a hoop stretch ratio, an axial stretch ratio, and a total stretch ratio. The aforementioned ratios are defined according to the following formulas:

Hoop stretch ratio=(max container diameter÷max internal preform diameter)

Axial stretch ratio=(height of container below finish÷height of preform below finish)

Total stretch ratio=Hoop stretch ratio×Axial stretch ratio

In some embodiments, preforms described herein may be designed to have an axial stretch ratio of between about 3.0 to about 3.5. In some embodiments, preforms described herein may be designed to have a hoop stretch ratio of between about 5.0 to about 5.5. In some embodiments, preforms described herein may be designed to have a total stretch ratio of between about 15.0 to about 19.25.

In some embodiments, preforms described herein may be designed to have total stretch ratios of between about 16.0 to about 18.0, which is significantly above typical total stretch ratios commonly used in the industry, which are typically about 13.0 to about 15.0. In some embodiments, a preform may be designed to have a total stretch ratio of between about 17.0 to about 18.0. In some embodiments, preforms described herein may be designed to have total stretch ratios that are up to about 10%, up to about 15%, or even up to about 20% greater than other preforms commonly used in the industry. The aforementioned stretch ratios may be achieved even while maintaining reductions in material as described herein.

EXAMPLES

Example 1

A group of preforms was made including two well characterized standard preforms and a novel preform as described herein. The novel preform included a significantly reduced amount of material as compared to the standard preforms. All preforms were made using the same PET resin dried to control the moisture content of the resin. A common mold was used to produce bottles from each of the preforms. The mold used herein may be used to produce bottles shaped as described in FIG. 6. Table 2 describes various dimensions and stretch ratios calculated therefrom for the various preforms and associated bottles made therefrom in this Example 1. The heights and diameters in Table 2 are expressed in inches. Stretch ratios are dimensionless numbers.

TABLE 2

|  | Preform A 21.5 g standard preform - 20 oz. Bottle | Preform B 22.2 g standard preform - 20 oz. Bottle | 18.75 g novel preform - 20 oz. Bottle |
|---|---|---|---|
| Bottle Height $H_B$ | 8.312 | 8.312 | 8.312 |
| Finish Height $H_F$ | 0.669 | 0.669 | 0.669 |
| Bottle Height $H_S$ | 7.643 | 7.643 | 7.643 |
| Bottle Diameter | 2.874 | 2.874 | 2.874 |
| Preform Length $H_P$ | 3.174 | 3.326 | 2.992 |
| Preform Length $H_O$ | 2.505 | 2.657 | 2.323 |
| Preform Diameter (ID) | 0.572 | 0.632 | 0.525 |
| Stretch Ratios |  |  |  |
| Axial (linear) | 3.05 | 2.88 | 3.29 |
| Hoop | 5.02 | 4.55 | 5.47 |
| Total | 15.33 | 13.08 | 18.01 |

Example 2

In Example 2, containers produced using the various preforms of Example 1 were tested under various conditions. The containers were inspected for stability. No substantial decrease in physical stability of the novel preform (18.75 g bottle) was noted. The bottles were also filled with a carbonated beverage with a gas volume of about 3.35. After filling the containers, barrier properties of the containers were tested. Table 3 describes relative changes in gas volume over both a 24 hr. period and over a storage period of greater than about 7 weeks.

TABLE 3

| Preform Weight | Initial gas volume | Gas volume after 24 hr | % Loss after 24 hr | Avg cc/pkg/day loss | Avg Weeks |
|---|---|---|---|---|---|
| (Novel preform) 18.75 g | 3.35 | 3.27 | 2.5 | 6.80 | 7.3 |
| (Preform A) 21.5 g | 3.36 | 3.26 | 3.1 | 6.21 | 7.7 |
| (Preform B) 22.2 g | 3.33 | 3.27 | 2.0 | 6.56 | 7.2 |

As reflected in Table 3, no substantial decrease in gas barrier performance was measured when comparing bottles made from the novel preform to bottles made from the industry standard preforms A and B.

While many examples in this description refer to certain features, it is understood that those features are described in an exemplary manner only and that other features and methods may be used. For example, any feature described for one embodiment may be used in any other embodiment. All ranges referenced herein should be understood to include the endpoints. Words such as upward, downward, left, right, and the like should not be construed to require a particular orientation or arrangement unless expressly so recited. Similarly, words such as first, second, and the like should not be construed to require a particular order or level of importance unless expressly so recited. Although the foregoing specific details describe certain embodiments, persons of ordinary skill in the art will recognize that various changes may be made in the details of these embodiments without departing from the spirit and scope of this invention as defined in the appended claims and other claims to be drawn to this invention, considering the doctrine of equivalents. Therefore, it should be understood that this invention is not limited to the specific details shown and described herein.

What is claimed is:

1. A generally hollow PET preform for making a stretch blow-molded container, comprising:
   a threaded finish portion;
   a neck portion depending from said finish portion and including substantially cylindrical walls;
   a transition portion depending from said neck portion and including a first substantially conical wall section having a first taper of wall thickness;
   a main portion depending from said transition portion and including a second substantially conical wall section having a second taper of wall thickness, the second taper of wall thickness being lesser than said first taper of wall thickness; and
   a closed, generally rounded tip portion depending from said main portion, said tip portion having a third taper of wall thickness;
   wherein said preform comprises stretch ratios with respect to said container including an axial stretch ratio of about 3.0 to 3.5, a hoop stretch ratio of about 5.0 to 5.5, and a total stretch ratio of about 16 to 18.

2. The preform of claim 1 wherein said substantially cylindrical walls of said neck portion have a thickness of about 1.73 mm to about 1.67 mm.

3. The preform of claim 1 wherein said first taper of wall thickness includes a percentage taper of between about 54% and about 58%.

4. The preform of claim 1 wherein said second taper of wall thickness includes a percentage taper of between about 2% and about 5%.

5. The preform of claim 1 wherein said third taper of wall thickness includes a percentage taper of between about 38% and about 45%.

6. The preform of claim 5 wherein said tip portion includes walls that taper between a maximum wall thickness and a minimum wall thickness;
  wherein said maximum wall thickness is about 4.1 mm to about 3.9 mm;
  wherein said minimum wall thickness is about 2.5 mm to about 2.3 mm.

7. The preform of claim 1 wherein said preform includes a poly (ethylene terephthalate) resin and has a mass of between about 18.6 grams and about 19.5 grams;
  wherein said container has a volume of about 20 oz.

8. The preform of claim 1 wherein said preform includes a poly (ethylene terephthalate) resin and has a mass of between about 18.6 grams and about 19.0 grams;
  wherein said container has a volume of about 20 oz.

9. The preform of claim 1 wherein said total stretch ratio is about 17 to about 18.

10. The preform of claim 1 wherein said main portion is about 2 times the length of said transition portion.

11. The preform of claim 1 wherein said main portion is about 3 times the length of said tip portion.

12. A generally hollow PET preform for making a stretch blow-molded container, comprising:
  a threaded finish portion;
  a neck portion depending from said finish portion, said neck portion including substantially cylindrical walls;
  a transition portion depending from said neck portion, said transition portion including a first substantially conical wall section and having a percentage taper of about 54% to about 58%;
  a main portion depending from said transition portion, said main portion including a second substantially conical wall section and having a percentage taper of about 2% to about 5%; and
  a closed, generally rounded tip portion depending from said main portion, said tip portion having a percentage taper of about 38% to about 45%;
  wherein said preform comprises stretch ratios with respect to said container including an axial stretch ratio of about 3 to 3.5, a hoop stretch ratio of about 5 to 5.5, and a total stretch ratio of about 16 to 18.

13. The preform of claim 12 further comprising a first curved wall region, a second curved wall region, and a third curved wall region;
  wherein said first curved wall region provides a smooth transition between said substantially cylindrical walls of the neck portion and said first substantially conical wall section;
  wherein said second curved wall region provides a smooth transition between said first substantially conical wall section and said second substantially conical wall section; and
  wherein said third curved wall region provides a smooth transition between said second substantially conical wall section and said tip portion.

14. The preform of claim 12 wherein said substantially cylindrical walls of said neck portion have a thickness of about 1.73 mm to about 1.67 mm.

15. The preform of claim 12 wherein said tip portion includes walls that taper between a maximum wall thickness and a minimum wall thickness;
  wherein said maximum wall thickness is about 4.1 mm to about 3.9 mm;
  wherein said minimum wall thickness is about 2.5 mm to about 2.3 mm.

16. The preform of claim 12 wherein said preform includes a poly (ethylene terephthalate) resin and has a mass of between about 18.6 grams and about 19.5 grams;
  wherein said container has a volume of about 20 oz.

17. The preform of claim 12 wherein said preform includes a poly (ethylene terephthalate) resin and has a mass of between about 18.6 grams and about 19.0 grams;
  wherein said container has a volume of about 20 oz.

18. The preform of claim 12 wherein said total stretch ratio is about 17 to about 18.

19. The preform of claim 12 wherein said main portion is about 2 times the length of said transition portion.

20. The preform of claim 12 wherein said main portion is about 3 times the length of said tip portion.

* * * * *